US011461815B1

(12) United States Patent
Durairaj et al.

(10) Patent No.: US 11,461,815 B1
(45) Date of Patent: Oct. 4, 2022

(54) MERCHANT INVOICING AND CUSTOMER RELATIONSHIP TRACKING SYSTEM

(71) Applicant: UIPCO, LLC, San Antonio, TX (US)

(72) Inventors: Ravi Durairaj, San Antonio, TX (US); Ryan Thomas Russell, San Antonio, TX (US); Ashley Raine Philbrick, San Antonio, TX (US); Carlos J P Chavez, San Antonio, TX (US); Stacy Callaway Huggar, San Antonio, TX (US); Quian Antony Jones, San Antonio, TX (US); Janelle Denice Dziuk, Falls City, TX (US); Yevgeniy Viatcheslavovich Khmelev, San Antonio, TX (US); Sumita T. Jonak, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 51 days.

(21) Appl. No.: 16/695,225

(22) Filed: Nov. 26, 2019

Related U.S. Application Data

(60) Provisional application No. 62/811,662, filed on Feb. 28, 2019.

(51) Int. Cl.
*G06Q 30/04* (2012.01)
*G06Q 30/02* (2012.01)
*G06Q 20/20* (2012.01)
*G06Q 20/22* (2012.01)
*G06Q 20/32* (2012.01)
*G06Q 20/42* (2012.01)
(Continued)

(52) U.S. Cl.
CPC .......... *G06Q 30/04* (2013.01); *G06Q 20/209* (2013.01); *G06Q 20/227* (2013.01); *G06Q 20/3223* (2013.01); *G06Q 20/3224* (2013.01); *G06Q 20/3672* (2013.01); *G06Q 20/405* (2013.01); *G06Q 20/42* (2013.01); *G06Q 30/0281* (2013.01)

(58) Field of Classification Search
None
See application file for complete search history.

(56) References Cited

U.S. PATENT DOCUMENTS

9,972,004 B1 * 5/2018 Donavalli .......... G06Q 20/3224
11,068,867 B1 * 7/2021 Tucker ............... G06Q 20/3224
(Continued)

*Primary Examiner* — Fateh M Obaid
(74) *Attorney, Agent, or Firm* — Plumsea Law Group, LLC (57) ABSTRACT

The present disclosure relates to a system, method, and apparatus for managing orders and invoices among customers of a retail merchant. The system allows a first customer to establish trusted links with one or more associated fellow customers, thereby authorizing the fellow customers to add purchases to the first customer's invoice. This allows a primary customer to purchase items for a secondary customer under tightly controlled and well communicated conditions, without extra work from the merchant. The system also uses location aware services on customer's smartphones to provide data that enhances the customers' experiences, by triggering prompts to open and close and invoice. The system also uses location aware services to determine which other customers may be in a related party together.

13 Claims, 8 Drawing Sheets

(51) Int. Cl.
   *G06Q 20/36*   (2012.01)
   *G06Q 20/40*   (2012.01)

(56) References Cited

U.S. PATENT DOCUMENTS

| | | | | |
|---|---|---|---|---|
| 2010/0041406 | A1* | 2/2010 | Kim | H04B 7/0695 |
| | | | | 455/446 |
| 2013/0138518 | A1* | 5/2013 | White | G06Q 20/325 |
| | | | | 705/16 |
| 2014/0095240 | A1* | 4/2014 | White | G06Q 10/063114 |
| | | | | 705/7.15 |
| 2014/0279098 | A1* | 9/2014 | Ham | G06Q 20/102 |
| | | | | 705/16 |
| 2014/0330654 | A1* | 11/2014 | Turney | G06Q 20/3224 |
| | | | | 705/15 |
| 2014/0379576 | A1* | 12/2014 | Marx | G06Q 20/405 |
| | | | | 705/44 |
| 2016/0012445 | A1* | 1/2016 | Villa-Real | G06Q 20/353 |
| | | | | 705/44 |
| 2016/0050530 | A1* | 2/2016 | Corbalis | H04W 12/02 |
| | | | | 455/456.1 |
| 2017/0011450 | A1* | 1/2017 | Frager | G06Q 30/0255 |
| 2020/0327531 | A1* | 10/2020 | Rogers | G06Q 20/3276 |

* cited by examiner

MERCHANT INVOICING AND CUSTOMER RELATIONSHIP TRACKING SYSTEM

CROSS-REFERENCE TO RELATED APPLICATIONS

This application claims the benefit of Provisional Patent Application No. 62/811,662 filed Feb. 28, 2019 and titled "Merchant Invoicing and Customer Relationship Tracking System," which is incorporated by reference herein in its entirety.

TECHNICAL FIELD

The present disclosure relates to the field of customer relationship management and merchant point of sale hardware systems, and related methods and smartphone applications.

BACKGROUND

Many well-known customer relationship management systems are known in the art of merchandizing and retail sales. In the particular field of restaurants, bars, coffee shops, and other dining establishments, a variety of software and hardware systems are variously used to in order to facilitate a positive customer experience. One common problem for these types of merchants is the desire of customers to split the bill among a party of associated customers.

Known smartphone apps are often used by customers in order to address the problem of splitting the check. For example, the app Venmo is popular for splitting checks among friends when dining out. Known smartphone apps generally require an input from the customer, such as by typing in a bill total or by taking a picture of a bill.

Furthermore, these known apps also require multiple money transfers between the people splitting the bill—usually with one person paying the merchant with e.g. a credit card and then being reimbursed by each friend each through a separate in-app money transfer. Accordingly, these conventional apps focus on merely doing the arithmetic of figuring out who owes what—and then enabling peer-to-peer cash transfer among the people splitting the bill.

These apps generally do not communicate with the merchant's point of sale system. Nor do these conventional apps include location aware services that might facilitate payment to a merchant, or facilitate authorization of who is sharing in payment.

Accordingly, there is a need in the art for systems, devices, and methods that addresses the shortcomings of the prior art discussed above.

SUMMARY OF THE DISCLOSURE

In one aspect, the disclosure provides system for managing orders and invoicing among multiple customers, comprising: at least one computing device, the computing device including a processor; and wherein the computing device is configured to perform the steps of: (1) receiving entrance location data indicating that a primary customer has entered a geographical location of a merchant; (2) sending a check-in electronic prompt to the primary customer, the check-in electronic prompt requesting whether the primary customer wishes to start an open invoice with the merchant; (3) creating an open invoice for the primary customer based on an input received in response to the check-in electronic prompt; (4) sending a party confirmation electronic prompt to the primary customer, the party confirmation electronic prompt requesting confirmation that at least one secondary customer is associated with the primary customer, and is authorized to add purchases to the primary customer's open invoice; (5) sending an authorization electronic notification to the at least one secondary customer indicating that the at least one secondary customer is authorized to add purchases to the primary customer's open invoice; (6) receiving an order from a secondary customer, and adding the order to the primary customer's open invoice; (7) computing an open invoice total purchase price; (8) receiving exit location data indicating that the primary customer has exited the geographical location of the merchant; (9) sending a check-out electronic prompt to the primary customer, the check-out electronic prompt requesting that the primary customer confirm that the open invoice has been closed and paid.

In another aspect, the disclosure provides a method comprising: (1) receiving a check-in electronic input from a primary customer, the check-in input causing a merchant to create an open invoice associated with the primary customer; (2) receiving first inside location data from the primary customer indicating a location of the primary customer inside the geographical location of the merchant; (3) receiving second inside location data from at least one third party customer indicating a location of the at least one third party customer inside a geographical location of the merchant; (4) identifying whether the at least one third party customer is likely to be a secondary customer associated with the primary customer by comparing the first inside location data with the second inside location data; (5) sending a party confirmation electronic prompt to the primary customer, the party confirmation electronic prompt requesting confirmation that at least one secondary customer is associated with the primary customer, and is authorized to add purchases to the primary customer's open invoice; (6) sending an authorization electronic notification to the at least one secondary customer indicating that the at least one secondary customer is authorized to add purchases to the primary customer's open invoice; (7) receiving an order from a secondary customer, and adding the order to the primary customer's open invoice; (8) computing an open invoice total purchase price; (9) sending a check-out electronic prompt to the primary customer, the check-out electronic prompt requesting that the primary customer confirm that the open invoice has been closed and paid.

In another aspect, this disclosure provides a mobile computing device, configured to: (1) send entrance location data indicating that a primary customer associated with the mobile computing device has entered a geographical location of a merchant; (2) receive a check-in electronic prompt, the check-in electronic prompt requesting whether the primary customer wishes to start an open invoice with the merchant; (3) send a check-in output in response to the check-in electronic prompt; (4) send inside location data indicating a location of the primary customer inside the geographical location of the merchant; (5) receive a party confirmation electronic prompt, the party confirmation electronic prompt requesting confirmation from the primary customer that at least one secondary customer is associated with the primary customer, and that the second customer is authorized to add purchases to the primary customer's open invoice; (6) send a party confirmation output in response to the party confirmation electronic prompt; (7) receive an order confirmation electronic prompt each time an order is to be added to the primary customer's open invoice by the secondary customer, the order confirmation electronic prompt prompting the primary customer to accept or deny whether the order made by the secondary customer will be placed on the primary customer's open invoice; (8) send an order confirmation output in response to the order confirmation electronic prompt; (9) receive an open invoice total purchase price; and (10) send exit location data indicating that the primary customer has exited the geographical location of the merchant.

Finally, in another aspect, this disclosure provides a non-transitory computer readable storage medium including instructions which, when executed by one or more computing devices, carry out a method for securing purchase transactions between a user and multiple merchants; the method comprising: (1) receiving entrance location data indicating that a primary customer has entered a geographical location of a merchant; (2) sending a check-in electronic prompt to the primary customer, the check-in electronic prompt requesting whether the primary customer wishes to start an open invoice with the merchant; (3) creating an open invoice for the primary customer based on an input received in response to the check-in electronic prompt; (4) receiving first inside location data from the primary customer indicating a location of the primary customer inside the geographical location of the merchant; (5) receiving second inside location data from at least one third party customer indicating a location of the at least one third party customer inside the geographical location of the merchant; (6) identifying whether the at least one third party customer is likely to be a secondary customer associated with the primary customer, by comparing the first inside location data with the second inside location data; (7) sending a party confirmation electronic prompt to the primary customer, the party confirmation electronic prompt requesting confirmation that at least one secondary customer is associated with the primary customer, and is authorized to add purchases to the primary customer's open invoice; (8) sending an authorization electronic notification to the at least one secondary customer indicating that the at least one secondary customer is authorized to add purchases to the primary customer's open invoice; (9) receiving an order from a secondary customer, and adding the order to the primary customer's open invoice; (10) computing an open invoice total purchase price; (11) receiving exit location data indicating that the primary customer has exited the geographical location of the merchant; (12) sending a check-out electronic prompt to the primary customer, the check-out electronic prompt requesting that the primary customer confirm that the open invoice has been closed and paid.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Systems to manage invoicing among multiple customers of a merchant are broadly disclosed that enable the merchant to track authorization relationships between customers. These systems also use location data from the customers to provide heightened customer service. Related methods and apparatuses, such a mobile computing device (aka a smartphone), are also disclosed—as well as a non-transitory computer readable storage medium including instructions which, when executed by one or more computing devices, carry out a method for managing invoicing among customers.

Most broadly, a system for managing orders and invoicing between a merchant and multiple customers may include features that track a relationship between a primary customer and a secondary customer. For example, in a dining establishment such as a restaurant or a bar, customers in a group may often prefer to allocate purchase among themselves in various ways. Some customers may prefer to split a mutual tab according to some agreement, or take turns buying each other a round of drinks, for example. The present disclosure allows a merchant to identify a primary customer in whose name an open invoice will be created, such as a bar tab, and then identify secondary customers who will be authorized to add orders to the primary customer's open invoice. By establishing a trusted link between the primary customer and the second customer, using the various means disclosed herein, the customers' desires to allocate purchases among themselves can be met in an efficient and timely manner.

Additionally, the use of location data can also enable a merchant to better manage invoicing among multiple customers. Widely used smartphones commonly include GPS technology that allows the geographic location of an individual holding the smartphone to be located with a reasonable degree of accuracy. A customer using a smartphone, with an app made in accordance with this disclosure, may therefore share his or her location with a merchant. The merchant may use this location data to identify when the customer has entered the geographical boundaries of the merchant's establishment. The merchant may also use this location data to identify relationships among customers, that are all running the same app, by comparing location data from the various customers to identify which customers are in a party together. By identifying which customers are in a dining group together, the system may prompt customers to form a trusted relationship among themselves that allows the customers to allocate purchases in a desired manner.

In this way, this disclosure provides various systems and smartphone apps that improve the customer service experience for the customer while also reducing the time and effort spent on invoicing by the merchant.

Figure 1:
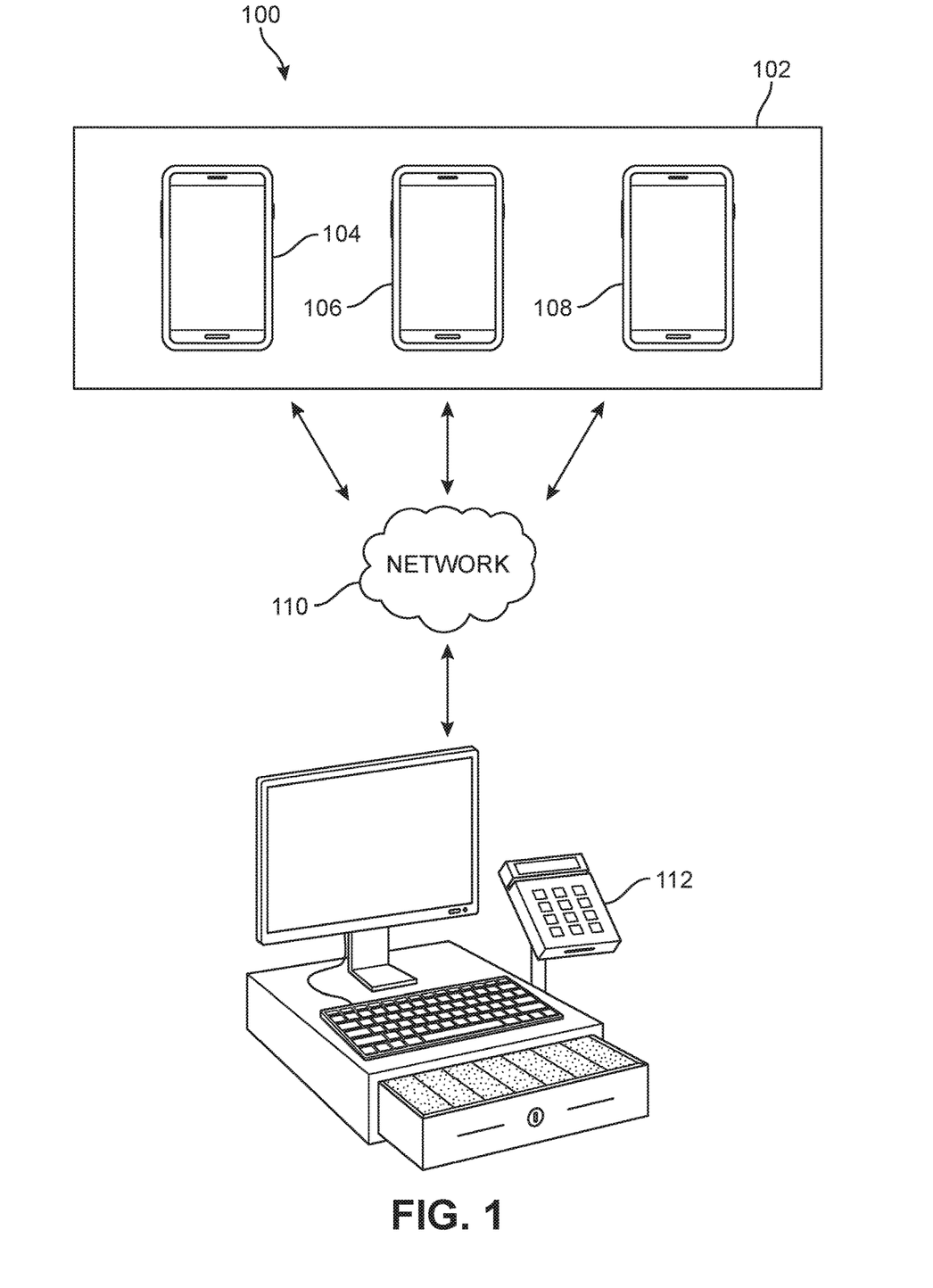
FIG. 1 is a diagram of a system of several pieces of hardware in communication with each other via a network.

In particular, FIG. 1 shows a system of several pieces of hardware in accordance with this disclosure. Namely, system 100 first includes hardware 102 associated with one or more customers. As shown, hardware 102 may be a mobile computing device such as a smartphone. In the embodiment shown in FIG. 1, three smartphones 104, 106, and 108 are all in communication with a computing device 112 via network 1120. Network 110 may include wireless cell phone networks such as 3G or LTE, Wi-Fi networks, and the vast multitude of hardwired cable communications hardware that make up the backbone of the internet.

Computing device 112 may broadly be any general purpose computer. As illustrated in FIG. 1, computing device 112 may be a point of sale system. A point of sale system may generally be any set of hardware that enables a merchant to complete a retail purchase transaction with a customer. Also sometimes referred to as a point of purchase system, a point of sale system may include components as: a credit card reader, a display screen, a keyboard, and a cash register. As is known in the retail industry, a point of sale system is usually responsible for preparing an invoice for the customer and then taking payment from the customer.

System 100 of several pieces of hardware 104, 106, 108, 112 in communication with each other via network 110 may therefore be the physical system that implements the management of customers and invoices as described here. Specifically, smartphones 104, 106, 108 may include software applications ("apps") that enable the customer to communicate with software that the merchant runs on point of sale device 112.

Figure 2:
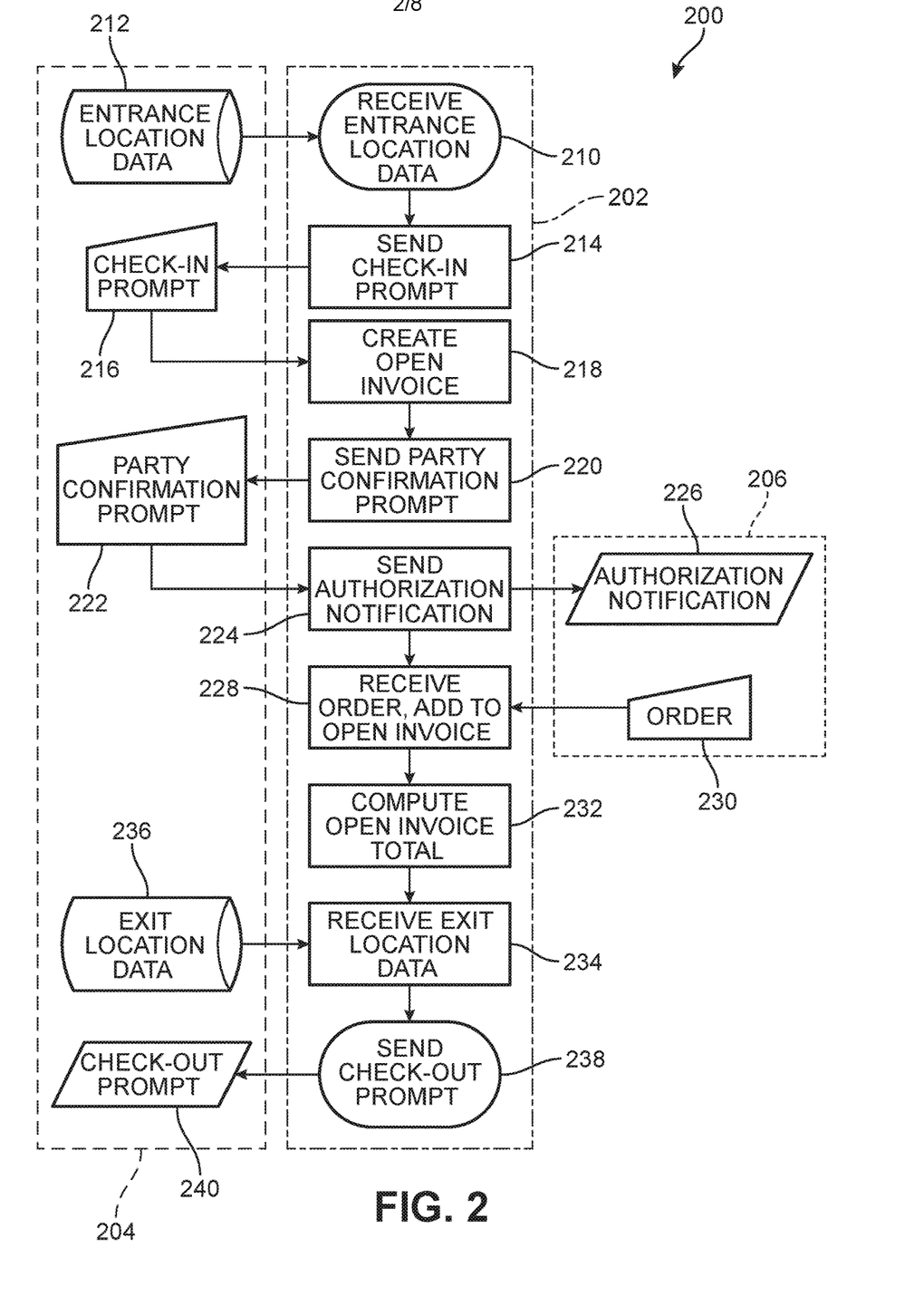
FIG. 2 shows a flowchart of a first process in accordance with this disclosure.

Specifically, software that the merchant may run on a point of sale system such as device 112 is illustrated in the flowchart of FIG. 2. FIG. 2 shows the steps of a method carried out by the merchant's device 112, as it receives information from various customers and takes the steps shown to generate the outputs.

Namely, method 200 includes several steps taken by merchant device 202 as it receives data from (and sends data to) a primary customer 204, and also receives data from (and sends data to) a secondary customer 206. The communications between merchant 202, primary customer 204, and secondary customer 206 shown in FIG. 2 may take place via network 110.

Method 200 may commence at step 210 when merchant 202 receives entrance location data 212 from primary customer 204. The entrance location data 212 may be electronic data that is descriptive of the primary customer currently entering a geographic location of the merchant. Entrance location data 212 may be GPS data received from the primary customer's smartphone.

In response to receiving entrance location data 212, method 200 may next include step 214 of sending a check-in electronic prompt 216 to the primary customer 204. The check-in prompt 216 may request whether the primary customer wishes to start an open invoice with the merchant. Primary customer 204 may then respond to the prompt 216 with a manual input, such as by clicking "yes" or "no" on their smartphone app. Merchant 202 may then proceed to create the open invoice at step 218.

Method 200 may next at step 220 send a party confirmation electronic prompt 222 to primary customer 204. The party confirmation prompt 222 may request that the primary customer confirm that at least one secondary customer is associated with the primary customer, and that the secondary customer is therefore authorized to add purchases to the open invoice created in step 218. This relationship between the primary customer and the secondary customer forms the basis for allocating purchases among a party of associated customers. Namely, by authorizing a secondary customer to add purchases to their own open invoice, the primary customer controls how much they pay for purchases by other people in their party. This allows each primary customer to allocate a certain portion of a group's purchases to themselves in a manner that is clear and unambiguous.

Primary customer 204 may then respond to party confirmation prompt 222 with a manual input, such as (again) by clicking "yes" or "no" on their smartphone app. Once merchant 202 receives the response to party confirmation prompt 222, it then sends an authorization electronic notification 226 to secondary customer 206 at step 224. In some embodiments, steps 220, 222, 224, and 226 may be repeated for each of multiple secondary customers that are in a dining part with the primary customer.

Subsequently, merchant 202 may then receive an order 230 from secondary customer 206 to be placed on primary customer 204's open invoice, in accordance with the trusted relationship. Merchant 202 adds the order to the open invoice at step 228. In step 232, merchant 202 next computes the open invoice total purchase price, as a running total. Steps 228, 230, and 232 may be repeated several times over the course of a dining experience, being repeated each time a secondary customer 206 adds another order 230 to the primary customer's open invoice.

In some embodiments, not particularly shown in FIG. 2, the trusted relationship established by the party confirmation prompt and authorization notification may also include additional features. Namely, this trusted relationship may be symbolized by a digital token. The digital token may be displayed on one or both of the primary customer's mobile computing device and the secondary customer's mobile computing device. The digital token may also incorporate one or more criteria under which the secondary customer is allowed to add order to the primary customer's open invoice. Criteria may include, for example: a time limit (no orders after 10 pm), a financial limit (no orders more than $20), a consumption limit (only three drinks max), or others.

Next, at the end of a dining experience, method 200 may come towards a conclusion when merchant 202 receives excite location data 236 at step 234. Exit location data is electronic data received from the primary customer indicating that the primary customer has exited the geographical location of the merchant.

As with the entrance location data 212 discussed above, exit location data 236 may be GPS data received from the primary customer's smartphone. However, in other embodiments, location data such as entrance location data 212 and exit location data 236 may be data associated with a different electronic protocol other than GPS data. For example, location data 212 or 236 may be Bluetooth data, with geographic location being determined using Bluetooth beacons inside the merchant's building, or Wi-Fi data with the geographic location determined using Wi-Fi triangulation.

In response to receiving exit location data 236 at step 234, method 200 finally sends a check-out prompt 240 to primary customer 204 at step 238. The check-out prompt may request that the primary customer confirm that the open invoice has been closed and paid. Check-out prompt 240 may also include options for payment of the open invoice, such as recalling a stored payment method that primary customer 204 has previously entered into their smartphone app.

Furthermore, in some embodiments, check-out prompt 240 may include additional features regarding payment of the open invoice. For example, device 112 or smartphone 104, 106, 108 may store information associated with two or more payment methods—such as two different sets of credit card information. This stored information may then be recalled in response to the check-out prompt. Furthermore, in some embodiments (not shown in FIG. 2) a method in accordance with this disclosure may also provide a recommendation of which of the two or more payment methods may advantageously be used to pay the particular invoice with the particular merchant at hand. For example, a recommendation for a payment method may be based on at least one of: a merchant discount available, a reward associated with a payment method (such as credit card cash back), and a coupon offered by a party other than the merchant (such as a manufacturer's coupon). In this way, a method may provide additional helpful options to the primary customer.

Figure 3:
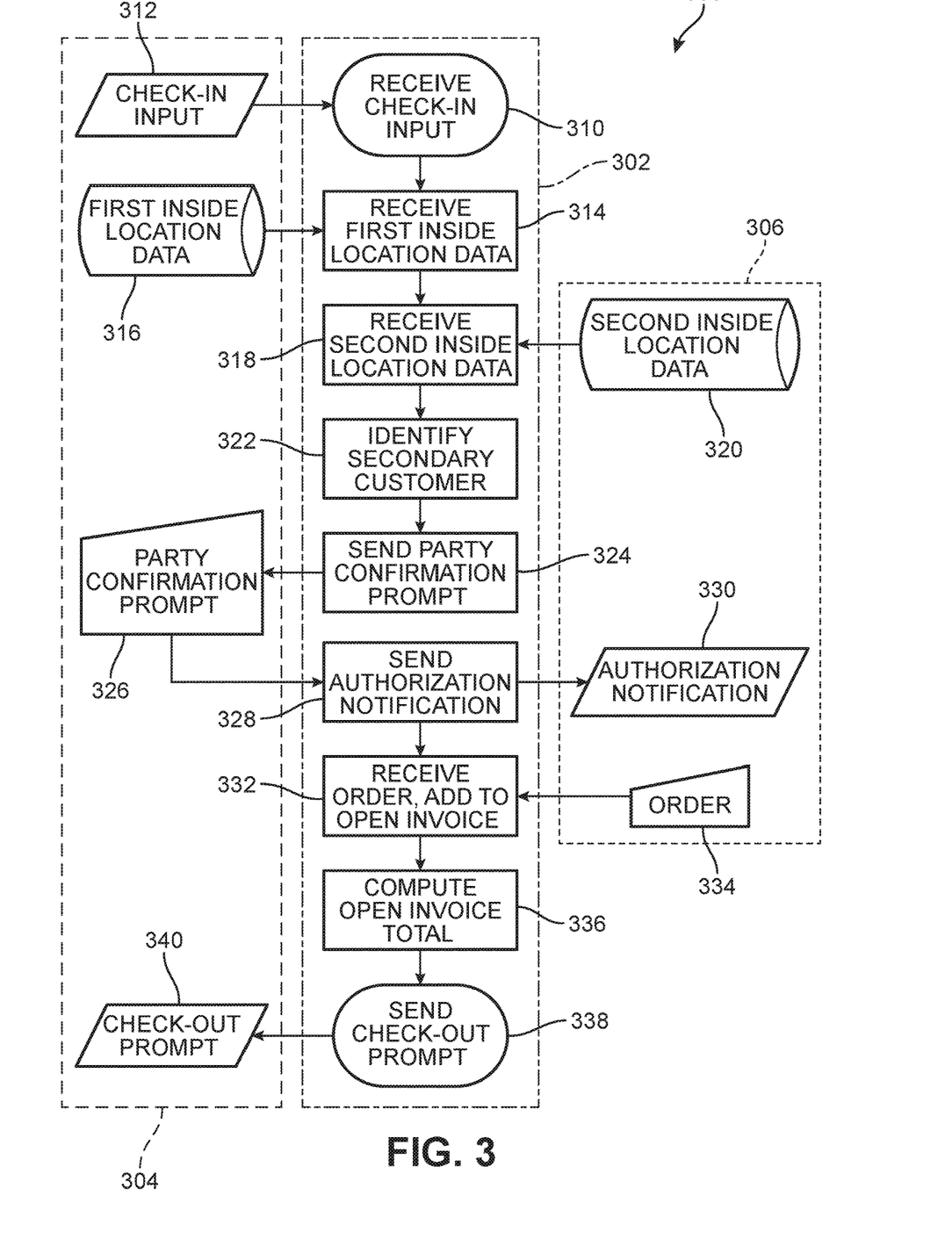
FIG. 3 shows a flowchart of a second process in accordance with this disclosure.

FIG. 3 shows a flowchart of a second embodiment of a method in accordance with this disclosure. As with method 200, method 300 shown in FIG. 3 is shown from the perspective of a merchant 302. In this embodiment, method 300 begins at step 310 when merchant 302 receives a check-in input from primary customer 312. Step 310 also may be include merchant 302 creating an open invoice associated with primary customer 312, also in response to receiving check-in input 312.

Next, method 300 receives first inside location data 316 from primary customer 304 at step 318. First inside location data 316 may indicate a location of the primary customer inside the geographic location of the merchant, i.e. where inside the restaurant the primary customer is located. As with location data discussed above with respect to FIG. 2, first inside location data may be GPS data or another data protocol as received from (or, in conjunction with) a smartphone. First inside location data 316 may be a single set of data describing a location at one specific time, or may be a time series of data describing a series of locations over time.

At step 318 method 300 next receives second inside location data 320 from a third party customer 306. As with first inside location data 316, second inside location data 320 may be descriptive of a geographic location of the third party customer 306 within a geographical location of the merchant's building. Second inside location data 320 may also be a time-series of data, describing multiple locations inside the merchant's building over time.

Method 300 next compares first inside location data 316 with second inside location data 320 to determine whether the third party customer 306 is likely to be a secondary customer who is associated with the primary customer 304, at step 322. Namely, the two sets of data are compared to evaluate the physical proximity between the primary customer and the third party customer inside the merchant's building. The physical proximity may be evaluated at one specific time, or over time. In one embodiment, the comparison of the two sets of inside location data 316, 320 may include computing an average physical distance between the primary customer and the third party customer over a predetermined period of time. Step 322 may then determine that a third party customer is likely to be associated with the primary customer if the average physical distance is below a predetermined threshold.

Once one or more secondary customers are identified from among the third party customers at step 322, method 300 next at step 324 sends a party confirmation prompt 326 to primary customer 304. As discussed above, party confirmation prompt 304 asks primary customer 304 to confirm that a person identified as likely to be a secondary customer associated with primary customer 304 is in fact authorized to add orders to primary customer's open invoice. In response, at step 328 method 300 may send an authorization notification 330 to the secondary customer.

Subsequent steps in method 300 may be similar to equivalent steps discussed above with respect to method 200. Namely, merchant 302 may receive order 334 from secondary customer 306 at step 332, and add the order to the primary customer's open invoice. Then at step 336 method 300 may compute an open invoice total purchase price. Steps 332 and 336 may be repeated each time an order 334 is placed. Finally, in step 338 merchant 302 may send a check-out prompt 340 to primary customer 304 to confirm that the open invoice has been paid.

Figure 4:
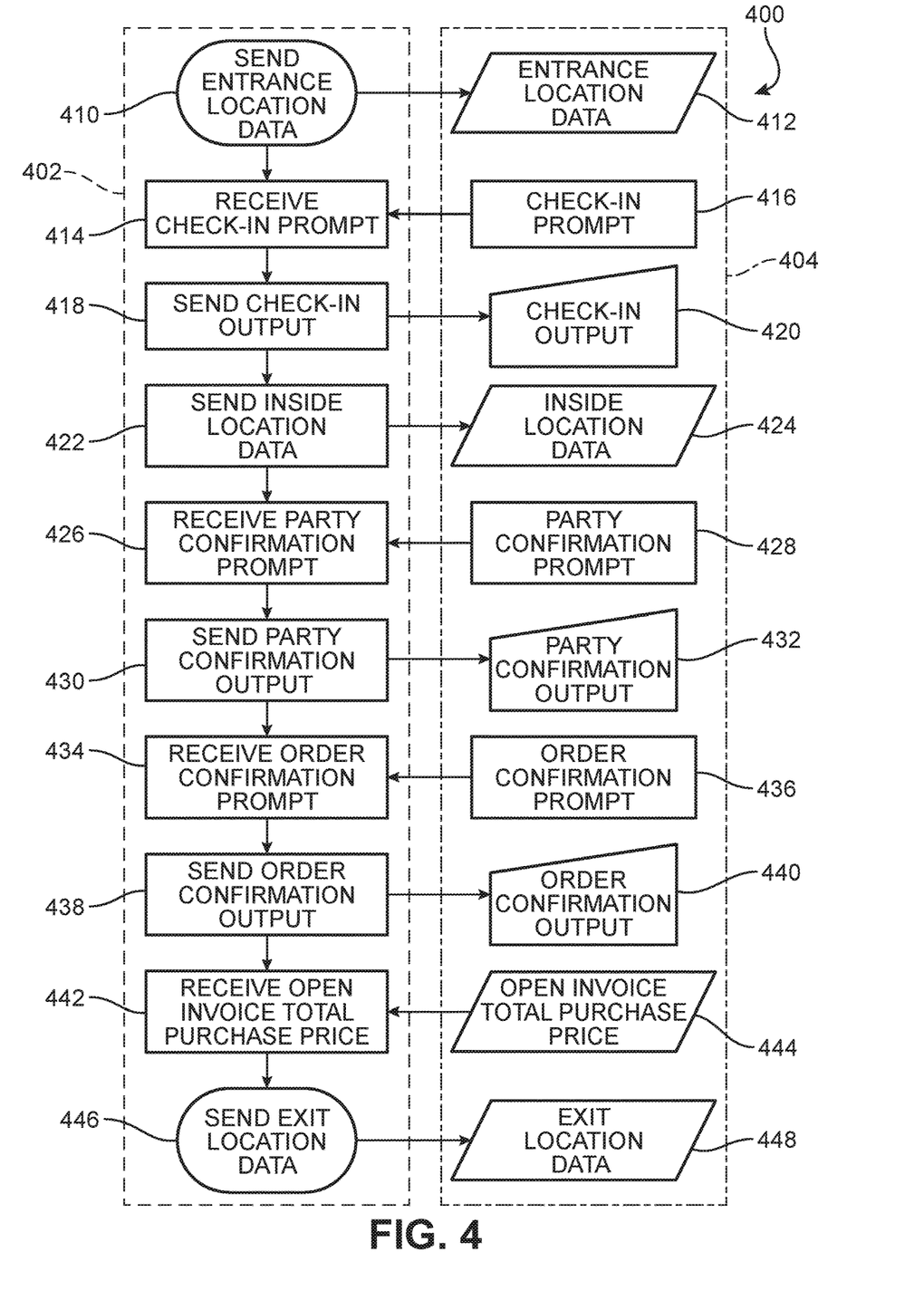
FIG. 4 shows a flowchart of a third process in accordance with this disclosure.

FIG. 4 shows a method 400 as performed from the perspective of a smartphone associated with a primary customer. In contrast, FIGS. 2 and 3 showed methods as performed by the merchant, such as by the merchant's point of sale system.

Method 400 as shown in FIG. 4 begins at step 410 by sending entrance location data 412 from primary customer 402 to merchant 404. Next, primary customer 402 receives a check-in prompt 416 from merchant 404 at step 414. In response, primary customer 402 sends a check-in output 420 back to the merchant 404 at step 418.

Subsequently, primary customer 402 send inside location data 424 to merchant 404 at step 422. Primary customer 402 then receives at step 426 the party confirmation prompt 428 from merchant 404, and sends a party confirmation output 432 back in response at step 430.

Merchant 404 next receives an order (not shown in FIG. 4) from a secondary customer, and generates order confirmation prompt 436. Primary customer 402 receives the order confirmation prompt 436 at step 434, and then generates and sends an order confirmation output 440 at step 438. Merchant 404 subsequently computes open invoice total purchase price 444, and primary customer receives open invoice total purchase price 444 at step 442. Finally, in the embodiment shown in FIG. 4, method 400 ends when primary customer sends exit location data 448 to merchant 404 at step 446.

Figure 5:
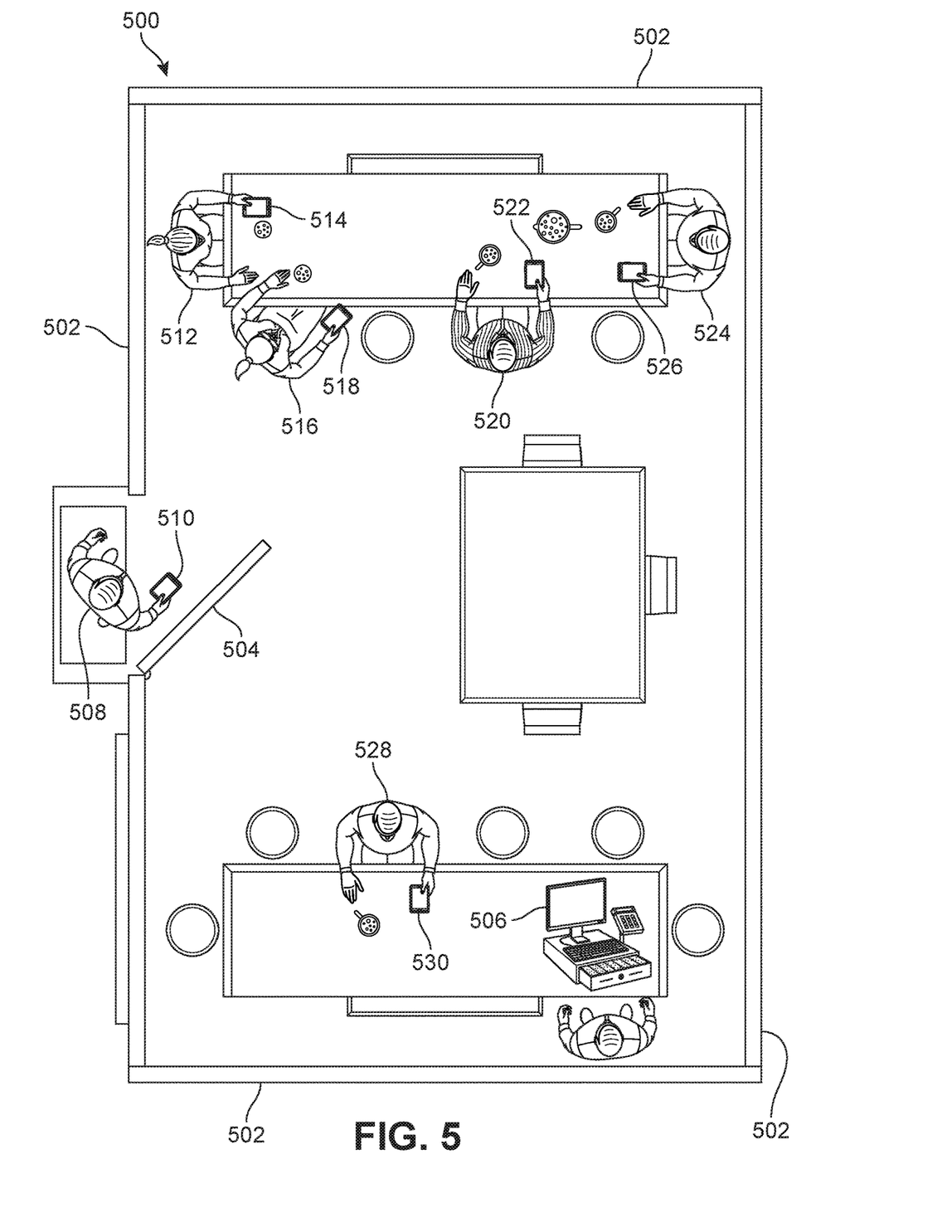
FIG. 5 is a diagram showing a restaurant with several customers and a point of sale system.

FIG. 5 shows a scene of embodiments in accordance with this disclosure being used in action at a restaurant 500. Specifically, restaurant 500 includes physical geographic boundaries 502 and point of sale system 506. Primary customer 508 is shown walking through door 504 into restaurant 500. Primary customer 508 has his smartphone 510, and smartphone includes an app in accordance with this disclosure that implements methods as discussed above.

In particular, FIG. 5 shows that smartphone 510 may generate and send to point of sale system 506 entrance location data upon crossing geographic boundaries 502 of restaurant 500 by passing through door 504. As a result of entering the physical location of restaurant 500, a method such as method 200 shown in FIG. 2 may be triggered. This may cause smartphone 510 and point of sale system 506 to commence executing software that takes actions as detailed in flowcharts FIGS. 2, 3, and 4. Smartphone 510 and point of sale system 506 may be in communication with each other via a network, as shown in FIG. 1.

The diagram of FIG. 5 therefore shows how location data generated by smartphone 510 may be used to initiate a customer service experience as disclosed herein by facilitating invoicing and customer management as a collaborative system across customer's hardware smartphone 510 and merchant's hardware point of sale system 506.

Figure 6:
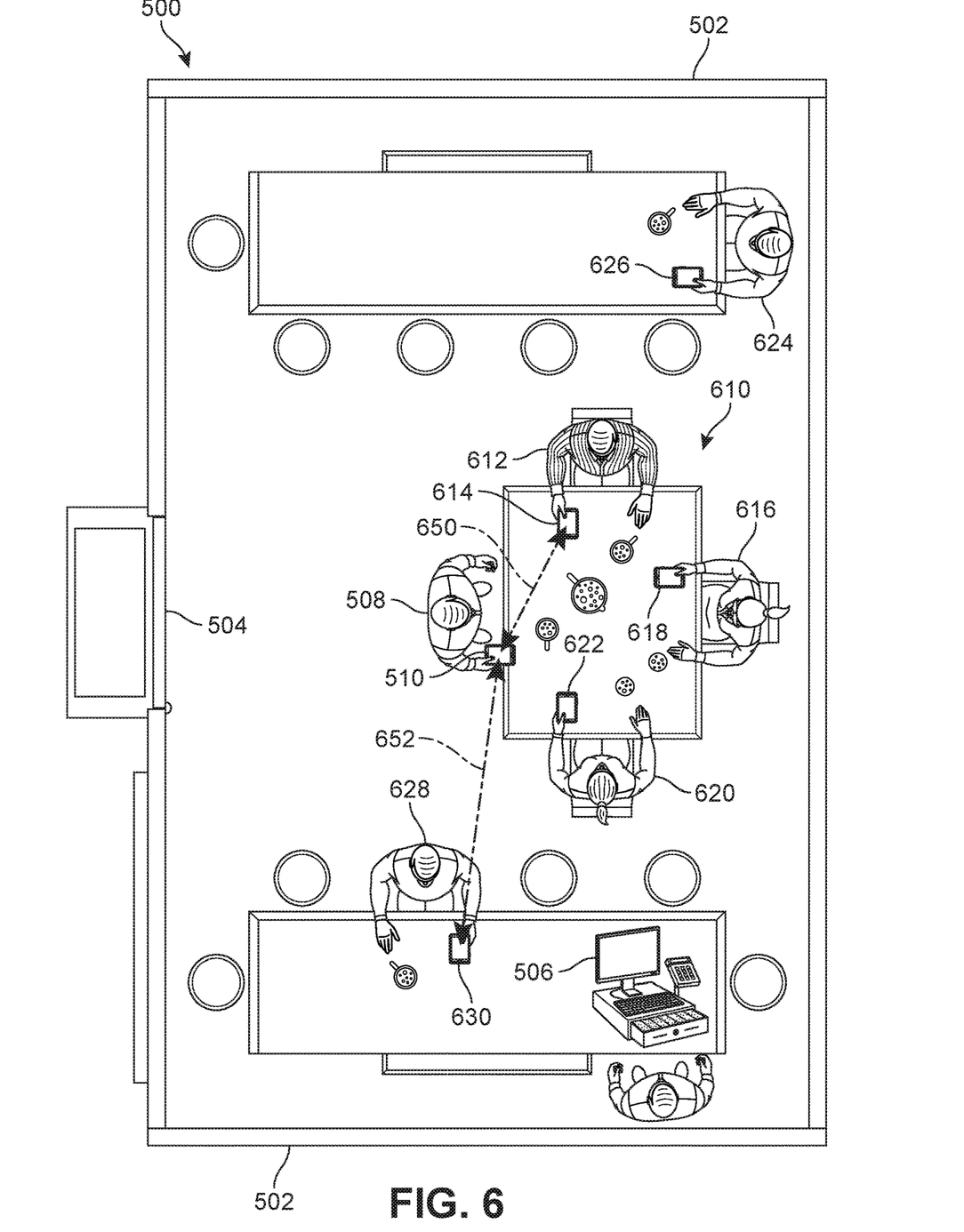
FIG. 6 is a diagram showing the restaurant with a group of associated customers sharing a table and using their smartphones to facilitate the dining experience.

FIG. 6 shows another diagram of embodiments in accordance with this disclosure being used in action at restaurant 500. This figure shows how additional location data can further be used to identifying relationships among various customers.

Specifically, in FIG. 6, primary customer 508 has met other members of his party 612, 616, and 620. As is common during dining experiences, the party (508, 612, 616, 620) is seated together in somewhat close physical proximity. Due to this physical proximity between the customers (508, 612, 616, 620), the customers' smartphones (510, 614, 618, 622) are also located in close physical proximity. Smartphones 510, 614, 618, 622 may therefore generate inside location data describing their location within geographic bounds 502 of restaurant 500.

In particular, primary customer 508 is associated with smartphone 510 that generates first inside location data (as discussed above). Each of the other patrons (612, 616, 620, 624, 628) in restaurant 500 may also generate inside location data from their smartphones (614, 618, 622, 626, 630), each of which may be considered as sets of second inside location data. The first inside location data and each of the second inside location data may then be communicated to point of sale system 506 via a network, as shown in FIG. 1.

Point of sale system 506 may then compare the first inside location data with each of the second inside location data (as described above). Point of sale system 506 may therefore determine that some patrons (612, 616, 620, 624, 628) are likely to be associated with primary customer 508 due to physical proximity and some are not. Specifically, first average distance 650 between primary customer 508 and third party customer 612 may be below a predetermined threshold such that third party customer 612 is likely to be a secondary customer who is associated with primary customer 508. Point of sale system 506 may therefore send a party confirmation prompt to smartphone 510 associated with primary customer 508, asking primary customer 508 whether third party customer 612 is in fact associated with him and authorized to add orders to his tab. This may be repeated for customers 616 and 620 as well.

In contrast, second average distance 652 between primary customer 508 and third party customer 628 may be above this threshold—and therefore point of sale system 506 may consider that customer 628 is not likely to be associated with primary customer 508. As a result, no part confirmation prompt will be sent to primary customer 508 with respect to customer 628—nor customer 624.

In some embodiments, point of sale system 506 may determine relationships among customers by comparing first inside location data to one or more sets of second inside location data, as discussed above. However, in other embodiments, whether a third party customer is associated with a primary customer may be determined not only by comparing the first inside location data generated by the primary customer with the second inside location data generated by the one specific third party customer—but also by comparing two or more sets of second inside data generated by two or more third party customers. Namely, in the embodiment of FIG. 6, each of third party customers 612, 616, 620 may each generate a set of second inside data. Point of sale system 506 may then compare both (a) first inside data generated by primary customer 508's smartphone 510 with second inside data generated by each of smartphones 614, 618, 622; and (b) each of second inside data generated by each of smartphones 614, 618, 622 with each other. Namely, if primary customer 510 is in close physical proximity with customer 612, and customer 612 is in close physical proximity with customer 616 then customer 616 may also be associated with primary customer 508. In this way, the system may draw on additional location data to determine relationships among customers.

In this way, FIG. 6 shows how systems and methods in accordance with this disclosure can use location aware services in customers' smartphones to determine relationships among customers to better facilitate invoicing and splitting a bill between a party.

Figure 7A:
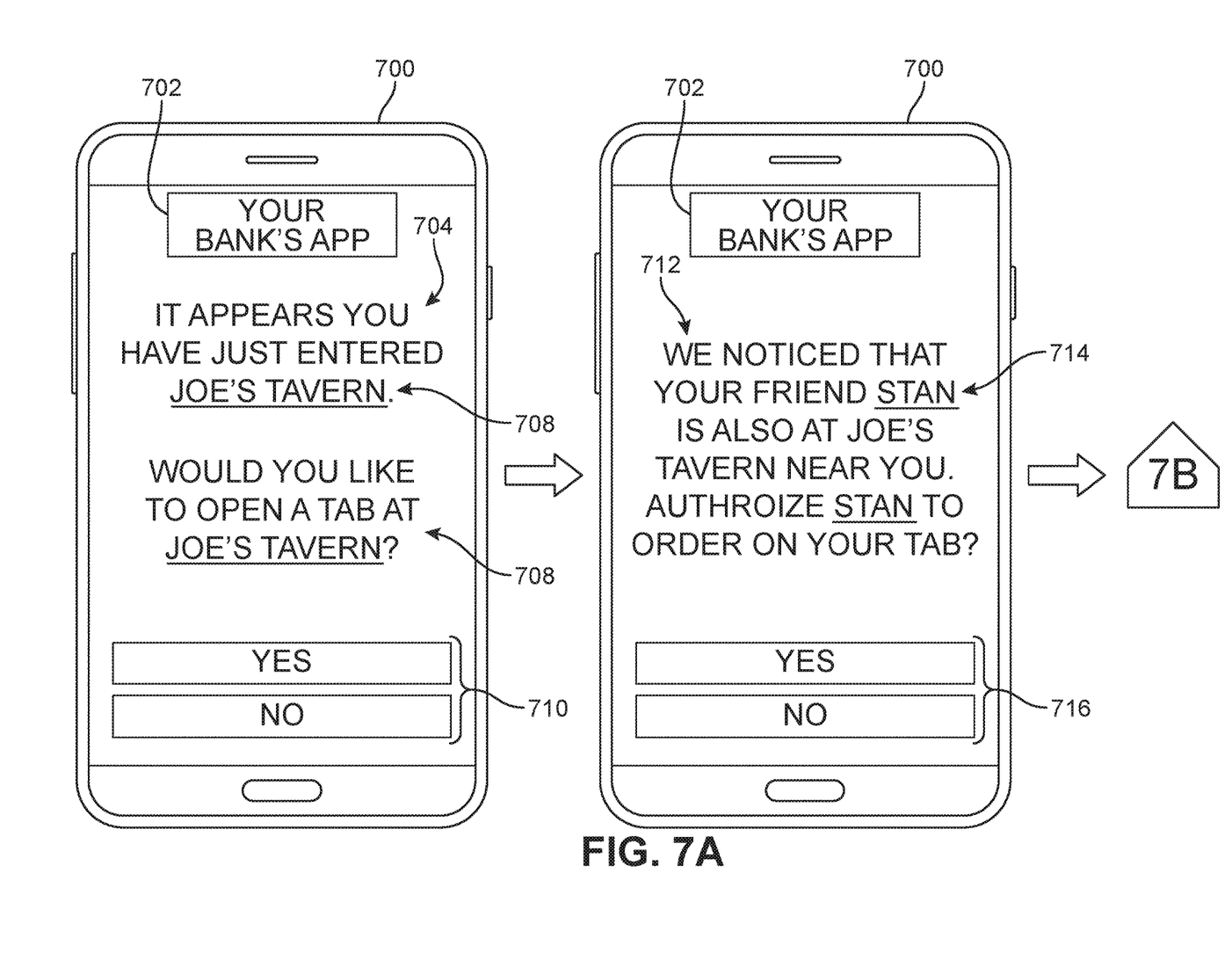
FIGS. 7a and 7b show diagrams of a smartphone app in accordance with this disclosure.
Figure 7B:
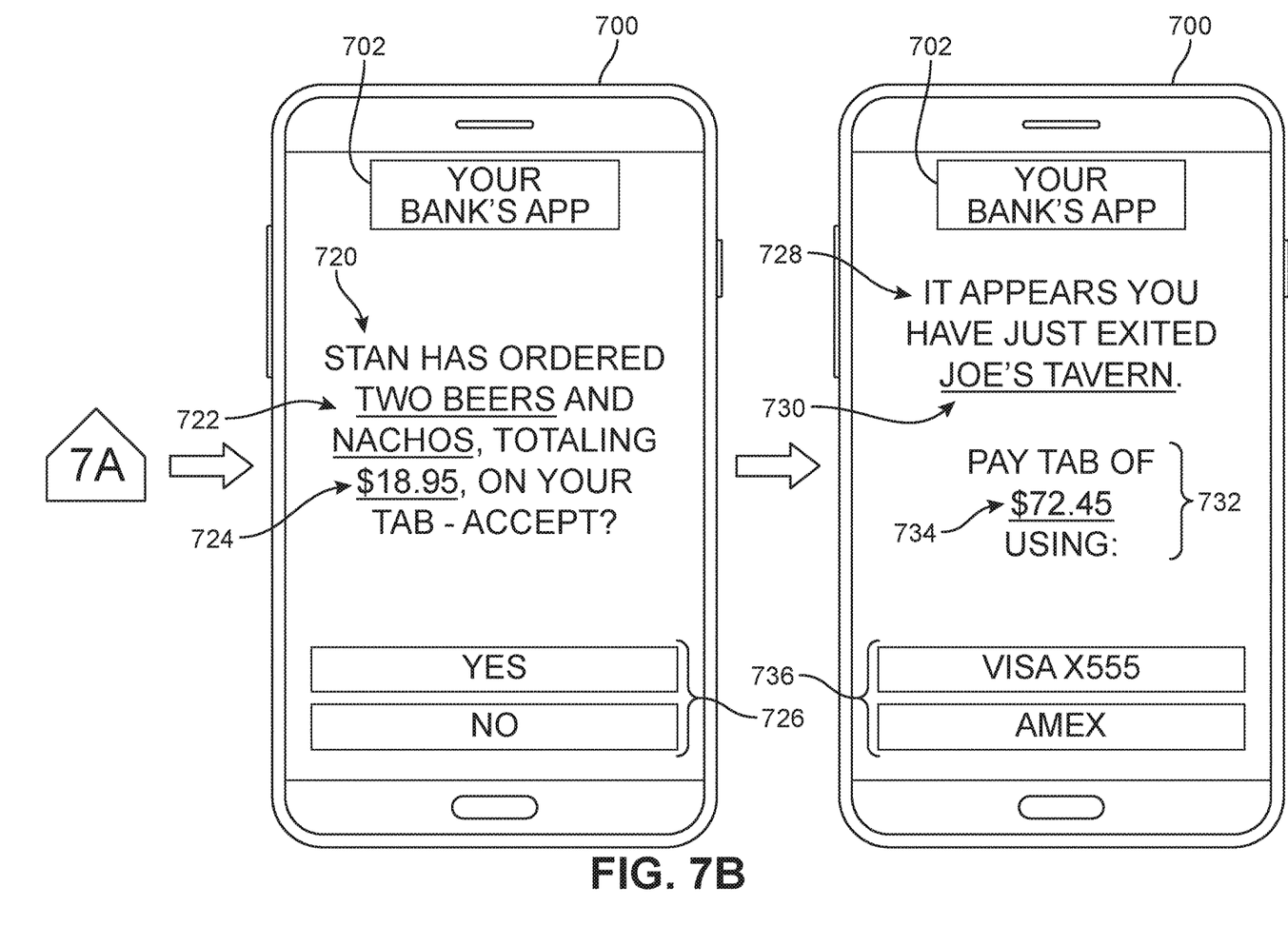

Finally, FIGS. 7A and 7B show embodiments of a mobile computing device smartphone app in accordance with this disclosure. The embodiments shown in these figures are from the perspective of a primary customer, as discussed above with respect to FIG. 4.

Specifically, in FIG. 7A smartphone 700 is running app 702. In this embodiment, features discussed herein are incorporated into an app offered by a bank—these features may therefore be bundled into an app that offers banking or other services, or may be offered in a standalone app. App 702 first presents a prompt 704. Prompt 704 may be a check-in prompt like check-in prompt 416 received at step 414 of method 400 shown in FIG. 4. As shown in prompt 704, entrance location data has been shared with a merchant "Joe's Tavern" 706. Check-in prompt 704 therefore asks primary customer whether they wish to open an invoice ("tab") at Joe's Tavern, soon after primary customer has entered the geographic boundaries of Joe's Tavern as illustrated in FIG. 5. Primary customer may then respond with a check-in output 710, like in step 418 of method 400 of FIG. 4.

Next in FIG. 7A, primary customer's smartphone 700 running app 702 receives party confirmation prompt 712. Party confirmation prompt 712 includes identification of potential associated second customer "Stan" 714. Primary customer may then respond to the prompt with part confirmation output 716 as per step 430 in method 400 of FIG. 4.

In FIG. 7B, primary customer's smartphone 700 running app 702 receives order confirmation prompt 720. Order confirmation prompt 720 includes details of the order 722 including price 724. Primary customer may then respond to the order confirmation prompt 720 with order confirmation output 726, accepting or rejecting the order that Stan has placed for two beers and nachos at Joe's Tavern.

Finally, FIG. 7B shows that primary customer's smartphone 700 running app 702 may receive a check-out prompt 728. The check-out prompt was generated by a point of sale system after it received exit location data, indicating that the primary customer had exited the geographic location of Joe's Tavern 730. The point of sale system also generated the open invoice total purchase price 732 of $72.45 734. In this embodiment, the system also recalls two options for payment methods 736 and prompts the primary customer to select one of them to pay the open invoice 732.

In this way, in some embodiments, several customers or members of a particular bank or other financial institution may use the features of app 702 as part of their existing bank's app so as to facilitate convenient splitting of a bill between them. This invention therefore provides benefits to a financial institution's members, as well as benefits to the merchants who are billing those members for goods or services.

Thus, this disclosure addresses problems with known approaches to splitting the bill after a dining experience has finished by establishing a link and confirming authorization at the time an order is placed.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A mobile computing device, configured to:
   generate entrance location data using GPS technology based on a geographic location of the mobile computing device, the entrance location data indicating that a primary customer associated with the mobile computing device has entered a geographical location of a merchant;
   send the entrance location data to the merchant;
   receive a check-in electronic prompt, the check-in electronic prompt requesting whether the primary customer wishes to start an open invoice with the merchant;
   send a check-in output in response to the check-in electronic prompt;
   generate inside location data using GPS technology based on a location of the primary customer associated with the mobile computing device being inside the geographic location of the merchant, the inside location data describing where inside the merchant the primary customer is located;
   send the inside location data to the merchant;
   receive a party confirmation electronic prompt, the party confirmation electronic prompt requesting confirmation, prior to a secondary customer placing an order with the merchant, from the primary customer that the secondary customer is associated with the primary customer, and that the secondary customer is authorized to add purchases to the primary customer's open invoice;
   the party confirmation electronic prompt being based on the inside location data received from the mobile computing device associated with the primary customer;
   send a party confirmation output in response to the party confirmation electronic prompt;
   receive an order confirmation electronic prompt each time an order is to be added to the primary customer's open invoice by the secondary customer, prior to the order being so added, the order confirmation electronic prompt prompting the primary customer to accept or deny whether the order made by the secondary customer will be placed on the primary customer's open invoice;
   send an order confirmation output in response to the order confirmation electronic prompt;
   receive an open invoice total purchase price;
   generate exit location data using GPS technology based on a location of the primary customer associated with the mobile computing device indicating that the primary customer has exited the geographic location of the merchant; and
   send the exit location data to the merchant.

2. The mobile computing device of claim 1, wherein the mobile computing device is configured to be in communication with a point of sale system operated by the merchant via a network.

3. The mobile computing device of claim 1, wherein the mobile computing device is further configured to:
   receive a check-out electronic prompt if the open invoice has not yet been paid and the exit location data indicates that the primary customer has exited the geographical location of the merchant, the check-out electronic prompt requesting payment for the open invoice; and
   send a check-out output that includes payment.

4. The mobile computing device of claim 1, wherein the mobile computing device is further configured to:
   send an primary order output, the primary order output being descriptive of one or more goods or services the primary customer wishes to purchase from the merchant.

5. The mobile computing device of claim 1, wherein the mobile computing device is further configured to:
   store information associated with at least two payment methods;
   recall the stored payment method information in response to receiving the open invoice total purchase price; and
   provide a recommendation to the primary customer regarding which of the at least two payment methods should be used to pay the open invoice total purchase price to the merchant, the recommendation being based on at least one of: a merchant discount available, a reward associated with a payment method, and a coupon offered by a party other than the merchant.

6. The mobile computing device of claim 1, wherein the mobile computing device is further configured to:
   store customer profile information associated with the primary customer; and
   send the customer profile information in response to receiving the check-in electronic prompt.

7. A mobile computing device, configured to:
   generate inside location data using GPS technology based on a location of a primary customer associated with the mobile computing device being inside a geographic location of a merchant, the inside location data describing where inside the merchant the primary customer is located;

send the inside location data to the merchant;

receive a party confirmation electronic prompt, the party confirmation electronic prompt requesting confirmation, prior to a secondary customer placing an order with the merchant, from the primary customer that the secondary customer is associated with the primary customer, and that the secondary customer is authorized to add purchases to an open invoice associated with the primary customer;

the party confirmation electronic prompt being based on the inside location data received from the mobile computing device associated with the primary customer;

send a party confirmation output in response to the party confirmation electronic prompt;

receive an order confirmation electronic prompt each time an order is to be added to the primary customer's open invoice by the secondary customer, prior to the order being so added, the order confirmation electronic prompt prompting the primary customer to accept or deny whether the order made by the secondary customer will be placed on the primary customer's open invoice; and send an order confirmation output in response to the order confirmation electronic prompt.

8. The mobile computing device of claim 7, wherein the mobile computing device is configured to be in communication with a point of sale system operated by the merchant via a network.

9. The mobile computing device of claim 7, wherein the mobile computing device is further configured to:

generate exit location data using GPS technology based on a location of the primary customer associated with the mobile computing device indicating that the primary customer has exited the geographic location of the merchant;

send the exit location data to the merchant;

receive a check-out electronic prompt if the open invoice has not yet been paid and the exit location data indicates that the primary customer has exited the geographical location of the merchant, the check-out electronic prompt requesting payment for the open invoice; and send a check-out output that includes payment.

10. The mobile computing device of claim 7, wherein the mobile computing device is further configured to:

store customer profile information associated with the primary customer;

receive a check-in electronic prompt, the check-in electronic prompt requesting whether the primary customer wishes to start an open invoice with the merchant;

send a check-in output in response to the check-in electronic prompt, the check-in output including the customer profile information.

11. The mobile computing device of claim 7, wherein the mobile computing device is further configured to:

store information associated with at least two payment methods;

receive an open invoice total purchase price;

recall the stored payment method information in response to receiving the open invoice total purchase price; and provide a recommendation to the primary customer regarding which of the at least two payment methods should be used to pay the open invoice total purchase price to the merchant, the recommendation being based on at least one of: a merchant discount available, a reward associated with a payment method, and a coupon offered by a party other than the merchant.

12. The mobile computing device of claim 7, wherein the mobile computing device is further configured to:

generate entrance location data using GPS technology based on the geographic location of the mobile computing device, the entrance location data indicating that the primary customer associated with the mobile computing device has entered the geographical location of a merchant;

send the entrance location data to the merchant; and receive a check-in electronic prompt, in response to sending the entrance location data, the check-in electronic prompt requesting whether the primary customer wishes to start an open invoice with the merchant.

13. The mobile computing device of claim 7, wherein the mobile computing device is further configured to:

receive and display a digital token, the digital token including one or more criteria by which to automatically accept or deny whether the order made by the secondary customer will be placed on the primary customer's open invoice.

* * * * *